US007921175B2

(12) United States Patent
Noguchi

(10) Patent No.: US 7,921,175 B2
(45) Date of Patent: Apr. 5, 2011

(54) REQUESTING A SERVICE FROM A SERVICE PROVIDING APPARATUS BY A SERVICE REQUEST APPARATUS

(75) Inventor: Toshiyuki Noguchi, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 976 days.

(21) Appl. No.: 10/563,093

(22) PCT Filed: Aug. 6, 2004

(86) PCT No.: PCT/JP2004/011646
§ 371 (c)(1),
(2), (4) Date: Dec. 30, 2005

(87) PCT Pub. No.: WO2005/014295
PCT Pub. Date: Feb. 17, 2005

(65) Prior Publication Data

US 2006/0161658 A1 Jul. 20, 2006

(30) Foreign Application Priority Data

Aug. 8, 2003 (JP) ................................ 2003-290590

(51) Int. Cl.
*G06F 15/16* (2006.01)
*G06F 3/12* (2006.01)

(52) U.S. Cl. ...................................... 709/207; 358/1.15

(58) Field of Classification Search .................. 709/207, 709/217–219, 238–244
See application file for complete search history.

(56) References Cited

U.S. PATENT DOCUMENTS

| | | | | |
|---|---|---|---|---|
| 6,310,692 | B1 | 10/2001 | Fan et al. | |
| 6,779,118 | B1 * | 8/2004 | Ikudome et al. | 726/7 |
| 6,782,495 | B2 * | 8/2004 | Bernklau-Halvor | 714/44 |
| 2001/0051893 | A1 * | 12/2001 | Hanai et al. | 705/10 |
| 2002/0018681 | A1 | 2/2002 | Kageyama | |
| 2002/0046101 | A1 * | 4/2002 | Ogawa et al. | 705/14 |
| 2002/0085223 | A1 * | 7/2002 | Bigi | 358/1.13 |
| 2004/0054983 | A1 | 3/2004 | Noguchi | |
| 2005/0198122 | A1 | 9/2005 | Saito | |
| 2006/0050300 | A1 | 3/2006 | Mitani | |

FOREIGN PATENT DOCUMENTS

| | | |
|---|---|---|
| EP | 1 085 441 | 3/2001 |
| EP | 1 206 088 | 5/2002 |
| JP | 2003-66787 | 3/2003 |
| JP | 2003-187124 | 7/2003 |
| JP | 2003-196068 | 7/2003 |
| KR | 2003-87145 | 11/2003 |

OTHER PUBLICATIONS

European Search Report, dated Mar. 18, 2009.

* cited by examiner

*Primary Examiner* — Ian N Moore
*Assistant Examiner* — Afshawn Towfighi
(74) *Attorney, Agent, or Firm* — Fitzpatrick, Cella, Harper & Scinto

(57) ABSTRACT

A client terminal acquires information associated with expendables of a device, and accesses a service providing server on the basis of a URL generated by a agent server. The client terminal receives page information that provides a service according to the information associated with the expendables of the device from the service providing server, and requests a service on the basis of the page information that provides a service.

6 Claims, 12 Drawing Sheets

FIG. 9

| LANGUAGE | RETAILER | SUPPORT SERVICE URL BASIC PART | |
|---|---|---|---|
| jp | — | http://www.support.jp/eshop | 901 |
| jp | 123 | http://www.xyzeshop.co.jp/eStore | 902 |
| us | 8756 | http://www.eshop.com/eCommerce | |
| fr | 2816 | http://www.estore.fr/support | |
| — | — | http://www.websup.com/sorry.htm | |

FIG. 10

| |
|---|
| http://www. xyzeshop. co. jp/eStore? lang=jp&model=F900&<br>Y=half&M=out&C=ok&BK=ok&PM=low&PC=half&retailer=123 |

FIG. 11

| MODEL | INK TANK COLOR | INK TANK MODEL NUMBER |
|---|---|---|
| BJF900 | Y | BCI-6Y |
| | M | BCI-6M |
| | C | BCI-6C |
| | BK | BCI-6BK |
| | PM | BCI-6PM |
| | PC | BCI-6PC |
| BJF××× | Y | BCI-××Y |
| | M | BCI-××M |
| | C | BCI-××C |
| | BK | BCI-××BK |
| | PM | BCI-××PM |
| | PC | BCI-××PC |
| BJF△△△ | Y | BCI-△△Y |
| | ⋮ | ⋮ |
| | | |

| INK TANK REMAINING AMOUNT | REMAINING AMOUNT ICON | EXCHANGE RECOMMENDATION LEVEL |
|---|---|---|
| half |  | 2 |
| low |  | 1 |
| Out |  | 1 |
| Full | | 0 |

REQUESTING A SERVICE FROM A SERVICE PROVIDING APPARATUS BY A SERVICE REQUEST APPARATUS

TECHNICAL FIELD

The present invention relates to a technique for providing a service associated with sales of expendables and accessories of a device via a network, and a technique for requesting a service.

BACKGROUND ART

Conventionally, a service which connects a server and client via a network such as the Internet or the like, launches a WWW browser of the client, accesses the server based on a URL held in advance by an application program of the client, and presents a page that provides printer information or a page that sells expendables has been proposed.

However, since the aforementioned service displays the predetermined sales page, when the remaining amount of a given ink of expendables of a printer becomes small, the server can only generate a page that presents all inks corresponding to that model. For example, when the printer uses ink tanks of six colors, even when the ink remaining amount of only one of six colors is small, the server can only present a sales page for all ink tanks of six colors corresponding to the notified model.

In this way, the user of the client must determine an ink tank, the remaining amount of which has become small in practice, from the presented ink tanks by himself or herself, and must select that ink tank from the page presented by the server.

Since the remaining level (remaining amount) of each ink tank cannot be notified, the server cannot present purchase of an ink tank in correspondence with the remaining amount of each individual ink tank. That is, the user must determine purchase of an ink tank in comparison with another page that shows the ink remaining amounts of the printer.

Furthermore, when the ink remaining amount of the printer becomes small, the user must search for or select a server suited to purchase such as a sales site of a retailer where he or she purchased the printer, so as to purchase ink tanks corresponding to that model.

When a printer retailer wants the user to continuously purchase expendables of the printer in addition to the printer itself, it cannot easily guide the user who wants to purchase to its sales site.

When the server has moved from the URL that is held in advance by the application driver and the URL is invalid, a page used to purchase ink tanks cannot be displayed.

DISCLOSURE OF INVENTION

The present invention has been made to solve the aforementioned problem, and has as its object to allow a client terminal to transmit information associated with expendables to a service provider via a network, to receive page information that provides a service according to the information associated with the expendables, and to request a required service from that page.

In order to achieve the above object, according to one aspect of the present invention, there is provided a request method of a service request apparatus that requests, to provide a service, a service providing apparatus, which provides a service associated with expendables via a network, comprising: a step of acquiring information associated with expendables from a device; a step of transmitting the information associated with the expendables to a service agent apparatus; a step of receiving page information used to provide a service according to the information associated with the expendables from the service providing apparatus designated by the service agent apparatus; and a step of requesting the service providing apparatus to provide a service on the basis of the page information that provides the service.

According to one aspect of the present invention, there is provided a providing method of a service providing apparatus which provides a service associated with expendables of a device, comprising: a step of receiving information associated with expendables of a device from a client terminal via an agent apparatus and a network; a step of generating page information used to present a service providing page according to the information associated with the expendables of the device to the client terminal; and a step of transmitting the page information generated in the step of generating to the client terminal via the network.

Further, according to one aspect of the present invention, there is provided a method of controlling an agent apparatus which mediates between a service providing apparatus that provides a service associated with expendables via a network, and a service request apparatus that requests a service, comprising: a step of acquiring information associated with expendables from a device; a step of generating access information required to access the service providing apparatus on the basis of the acquired information associated with the expendables; and a step of transmitting the generated access information to the service request apparatus.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

FIG. 9 shows the configuration of a support service transfer destination table in the embodiment of the present invention;

FIG. 10 shows the format of a support service URL in the embodiment of the present invention;

FIG. 11 shows a model—ink tank correspondence table in the embodiment of the present invention.

BEST MODE FOR CARRYING OUT THE INVENTION

Preferred embodiments of the present invention will now be described in detail in accordance with the accompanying drawings.

Figure 1:
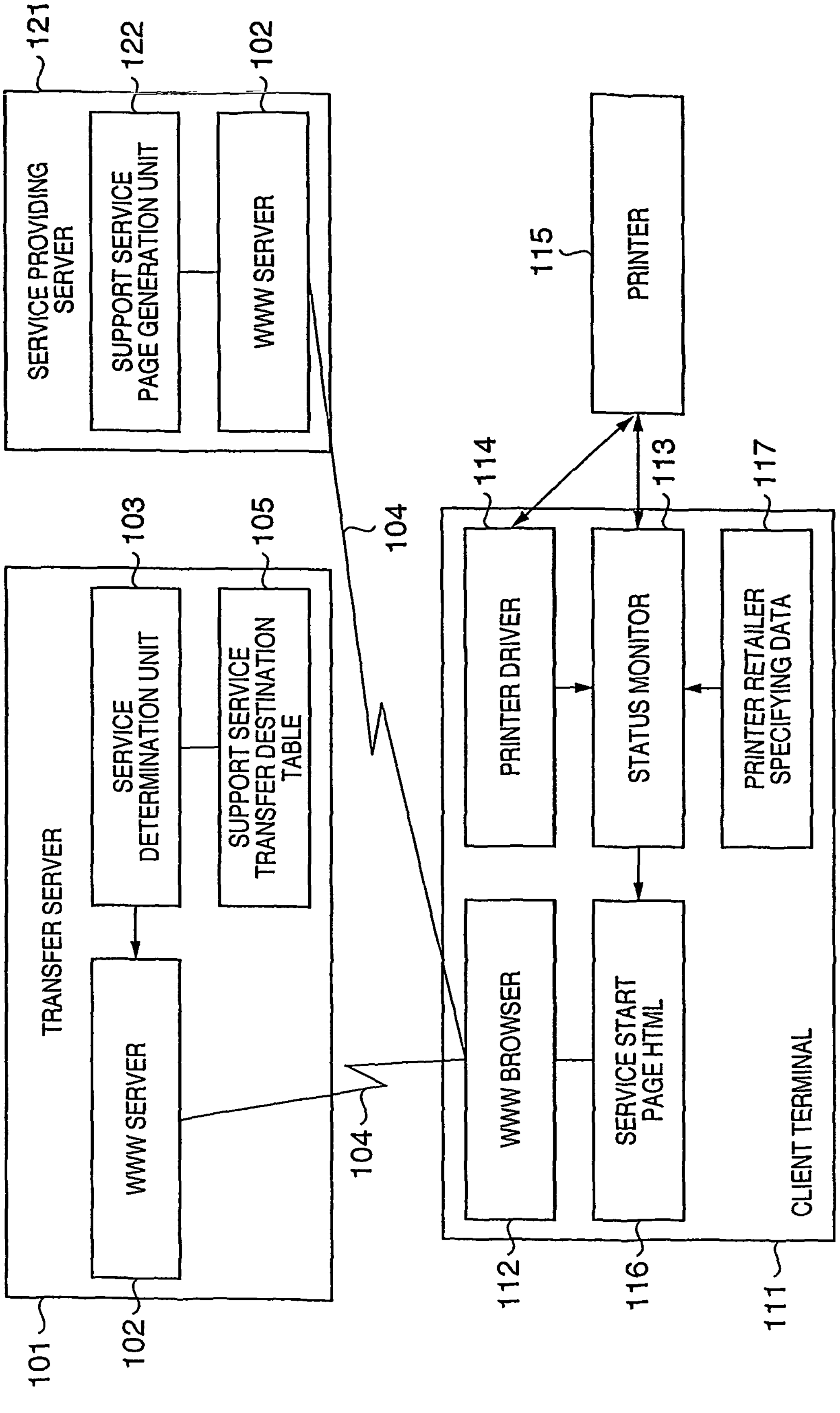
FIG. 1 is a block diagram showing an example of the arrangement of an information processing system according to an embodiment of the present invention.

FIG. 1 shows an example of the arrangement of an information processing system according to this embodiment. Referring to FIG. 1, reference numeral 111 denotes a client terminal which serves as a print controller that controls a printer to be described later. Reference numeral 101 denotes a transfer server; and 121, a service providing server. These servers correspond to information processing apparatuses of a site that provides a service upon reception of an access request from the client terminal 111. Reference numeral 104 denotes a network such as the Internet, local area network (LAN), or the like. Reference numeral 115 denotes a printer connected to the client terminal 111. More specifically, the printer 115 is an image forming device such as an ink-jet printer of an ink-jet printing system, a laser beam printer of an electrophotography system, or the like.

In the client terminal 111, reference numeral 112 denotes a WWW (World Wide Web) browser which runs on the client terminal 111. The WWW browser 112 has a function of acquiring various HTML (Hypertext Markup Language) files described in, e.g., the HTML language or the like from WWW servers on the transfer server 101 and service providing server 121 via the network 104, or loading an HTML file stored in the client terminal 111, parsing the description of each HTML file, and displaying it on a display device (a CRT 201 to be described later) of the client terminal 111.

Reference numeral 114 denotes a printer driver, which is software that controls the printer 115. The printer driver 114 receives a print command from arbitrary application software in the client terminal 111 under the control of an operating system (OS), and controls a print process of the printer 115. In the example shown in FIG. 1, one printer 115 is connected to the client terminal 111. A plurality of printers can be connected to the client terminal 111. In this case, a plurality of printer drivers required to control these printers are installed.

Reference numeral 113 denotes a status monitor which is software that presents the status of the printer 115 to the user. The status monitor 113 is launched when the status to be presented to the user (e.g., the small remaining amount of each ink, paper jam, and the like) has occurred in the printer during a print process, and has a function of displaying a page that displays required information and operation buttons on the display device of the client terminal 111. Note that the user can launch the status monitor 113 at an arbitrary timing.

Reference numeral 116 denotes service start page HTML data which is generated by the status monitor 113. The WWW browser 112 displays a service start page on the display device on the basis of this service start page HTML data 116. Reference numeral 117 denotes printer retailer specifying data, which is saved in a storage unit in the client terminal 111, an external storage device connected to the client terminal 111, or the like. More specifically, data (a company name or shop name of purchase, code, and the like) that can specify a shop of purchase when the user purchased the printer 115 is saved.

In the transfer server 101 and service providing server 121, reference numeral 102 denotes a WWW server, which has a function of receiving various requests via the network 104, and a function of transmitting various responses to those requests. The transfer server 101 parses data (WEB support URL: Uniform Resource Locator) sent from the client terminal 111, and transfers a support service URL that provides a support service suited to the status of the user's printer to the WWW browser 112 of the client terminal 111. Note that the WEB support URL and support service URL will be described in detail later.

In the transfer server 101, reference numeral 103 denotes a service determination unit, which parses data (WEB support URL) sent upon operation on the page displayed on the WWW browser 112 of the client terminal 111, and transfers a service start URL (support service URL) of the service providing server 121 that provides a server corresponding to the status of the printer 115 to the WWW browser 112 of the client terminal 111. Reference numeral 105 denotes a support service transfer destination table, which is saved in a storage unit in the transfer server 101, an external storage device connected to the transfer server 101, or the like.

This table 105 is used when the service determination unit 103 parses data sent from the client terminal 111, and generates a URL (support service URL) to be transferred to the service providing server 121 that provides a support service. That is, the service providing server 121 is a server designated by the support service URL transferred from the transfer server 101, and provides, e.g., an online sales service of ink tanks in the printer 115 and the like to the user.

In the service providing server 121, reference numeral 122 denotes a support service page generation unit, which parses the support service URL, and generates a page that provides user services such as an ink tank sales service and the like.

Figure 2:
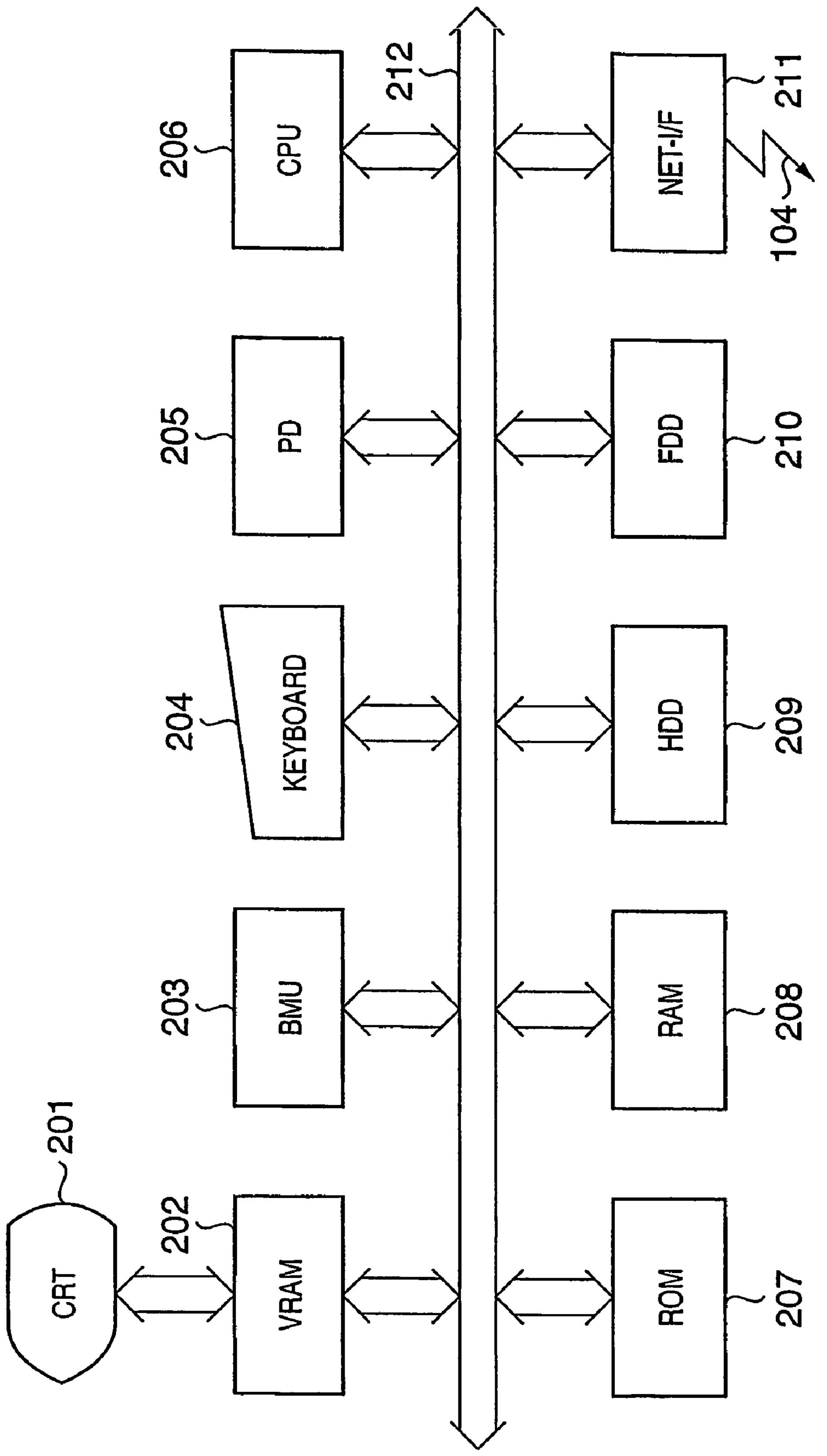
FIG. 2 is a block diagram showing the hardware arrangement of a client terminal 111 in the embodiment of the present invention.

FIG. 2 is a block diagram showing the hardware arrangement of the client terminal 111 in this embodiment. Referring to FIG. 2, reference numeral 201 denotes a display device (CRT) which displays edit information such as a document, graphics, image, and the like to be edited, user interface information such as icons, messages, menus, and the like (to be described later), and so forth on its display screen. Reference numeral 202 denotes a video RAM (VRAM), on which an image to be displayed on the display screen of the CRT 201 is rendered. An image generated on this VRAM 202 is transferred to and displayed on the CRT 201 according to predetermined rules.

Reference numeral 203 denotes a bit move unit (BMU), which controls data transfer between memories (e.g., the VRAM 202 and another memory), and that between a memory and each I/O device (e.g., a network interface to be described later). Reference numeral 204 denotes a keyboard which has various keys used to input characters, a document, and the like. Reference numeral 205 denotes a pointing device (PD), which is used to designate objects such as icons, menus, and the like displayed on the display screen of the CRT 201.

Reference numeral 206 denotes a CPU, which controls devices connected to a CPU bus on the basis of control programs and control data stored in a ROM, hard disk, or flexible disk to be described later. Reference numeral 207 denotes a ROM which holds various control programs and control data. Reference numeral 208 denotes a RAM which has a work area for the CPU 206, a data save area upon execution of an error process, a load area of control programs, and the like.

Reference numeral 209 denotes a hard disk drive (HDD) which controls access to a hard disk (HD). Reference numeral 210 denotes a flexible disk drive (FDD) which controls access to a flexible disk (FD). Reference numeral 211 denotes a network interface (Net-I/F), which is used to communicate with the transfer server 101, service providing server 121, printer 115, other information processing apparatuses and devices (not shown), and the like. Note that a communication with the printer 115 may be made via a parallel interface, USB (Universal Serial Bus) as a wired interface, Bluetooth as a wireless interface, or the like.

Reference numeral 212 denotes a CPU bus, which includes an address bus, data bus, and control bus. Note that control programs can be provided from the ROM 207, hard disk, and flexible disk to the CPU 206. Also, control programs can be provided from other information processing apparatuses via the network 104.

Note that the hardware arrangement of the transfer server 101 and service providing server 121 is the same as that of the client terminal 111, and a description thereof will be omitted.

Figure 3:
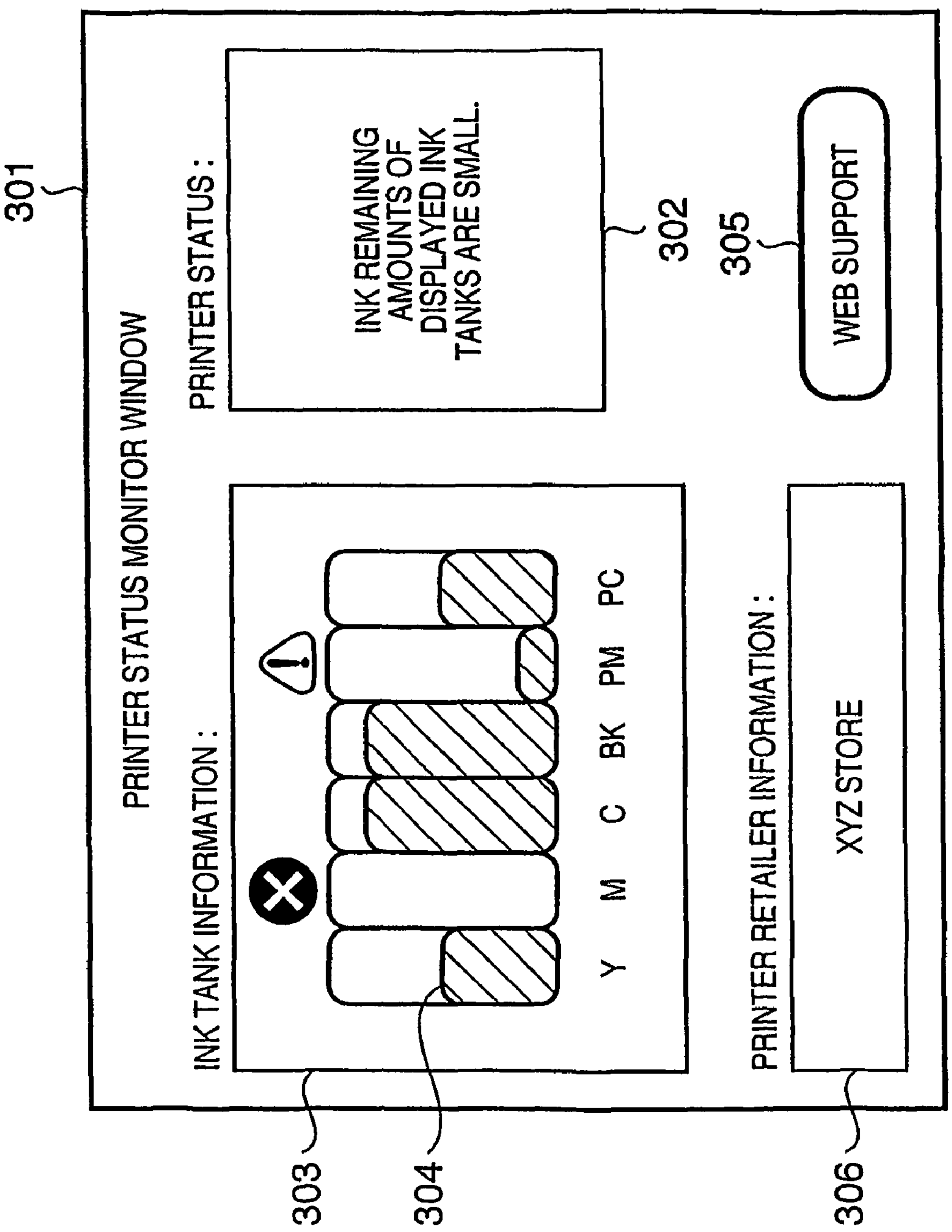
FIG. 3 shows an example of a printer status monitor window displayed on the client terminal 111.

FIG. 3 shows an example of a printer status monitor window displayed by the client terminal 111. When the status to be presented to the user (e.g., a small ink remaining amount, paper jam, or the like) has occurred in the printer 115 while the user is executing a print process at the client terminal 111, the status monitor 113 is launched and displays a page shown in FIG. 3. Also, the status monitor 113 can be launched by the user at an arbitrary timing or simultaneously with execution of a print process, and the page shown in FIG. 3 is displayed.

Referring to FIG. 3, reference numeral 301 denotes a printer status monitor window, which displays the status of the printer 115 connected to the client terminal 15. Reference numeral 302 denotes an area that displays comment text and the like of the status of the printer 115. Reference numeral 303 denotes an area that displays ink tank information of the printer 115.

In the example shown in FIG. 3, the remaining amounts of ink tanks are displayed for respective colors of the ink tanks of six colors of the printer 115. Note that each individual ink tank remaining amount display field 304 can indicate the ink remaining amount (a sufficient amount (full), about half (half), small (low), or no remaining amount (out)) as an indicator bar, as shown in FIG. 3. The remaining amount that suggests a requirement of exchange of an ink tank (i.e., small or none) is simply indicated by an icon (!) or (X).

Reference numeral 306 denotes an area that displays a shop name where the user purchased the printer. Reference numeral 305 denotes a WEB support button. When the user wants to purchase ink tanks by checking the ink tank remaining amount display area 303, he or she inputs an instruction by clicking the WEB support button 305 using the pointing device 205 so as to use a support service such as ink purchase or the like via the Internet, thus starting a WEB support service. The WWW browser 112 is then launched, and displays a service start page shown in FIG. 4.

Figure 4:
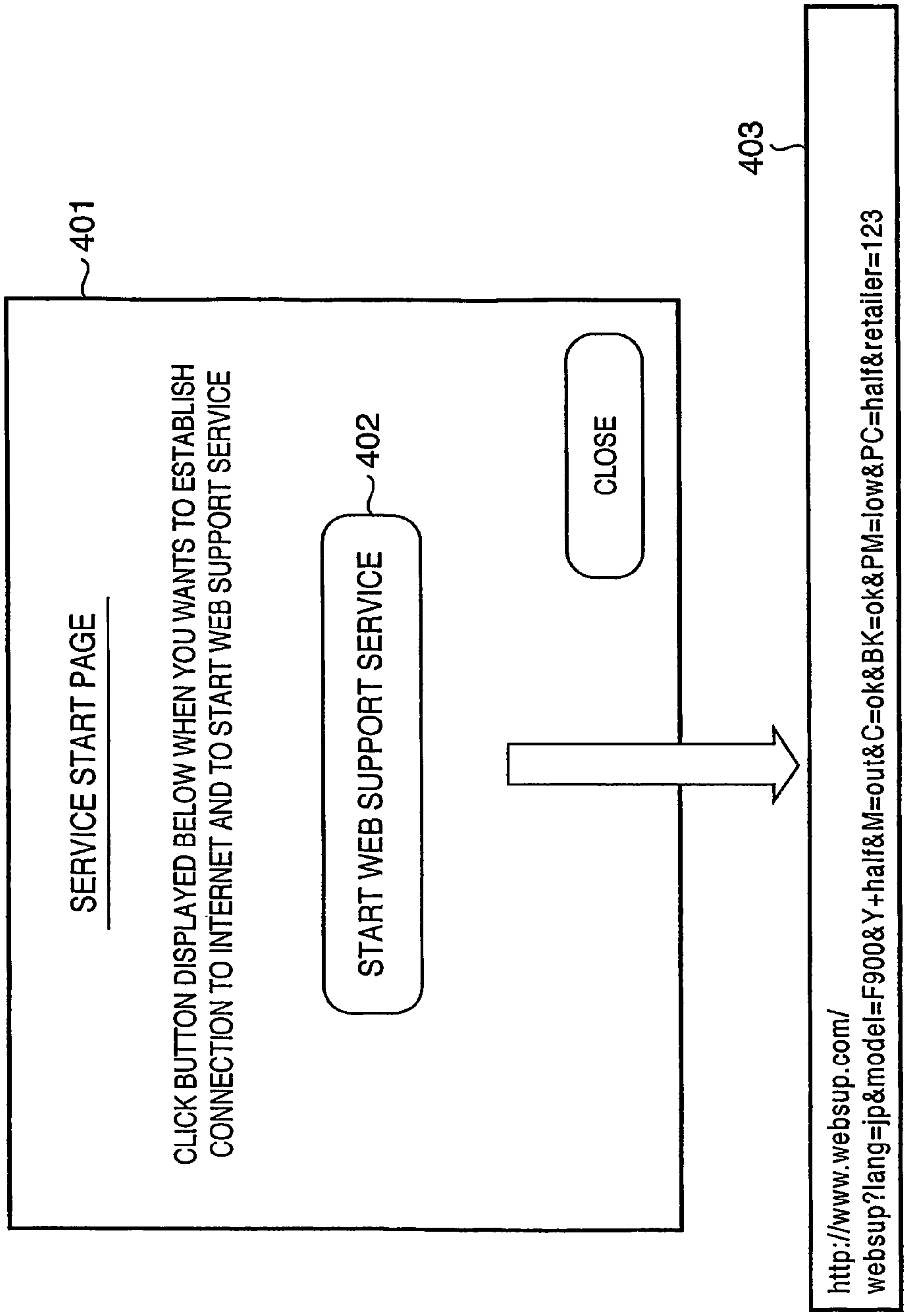
FIG. 4 shows an example of a service start page displayed by a WWW browser 112.

FIG. 4 shows an example of a service start page displayed by the WWW browser 112. Referring to FIG. 4, reference numeral 401 denotes a service start page displayed by the WWW browser 112. The page 401 is displayed by the WWW browser 112 when the user has clicked the WEB support button 305 on the printer status monitor window 301. Reference numeral 402 denotes a WEB support service start button, which is used to request a WEB support service from the client terminal 111 via the Internet. The user approves, by checking the service start page 401, that connection to the Internet will be established and printer information will be submitted, and can then click the button 402.

Reference numeral 403 denotes an example of the WEB support URL, which is transmitted from the WEB browser 112 to the transfer server 101 via the network 104 when the user has clicked the WEB support service start button 402.

Figure 5:
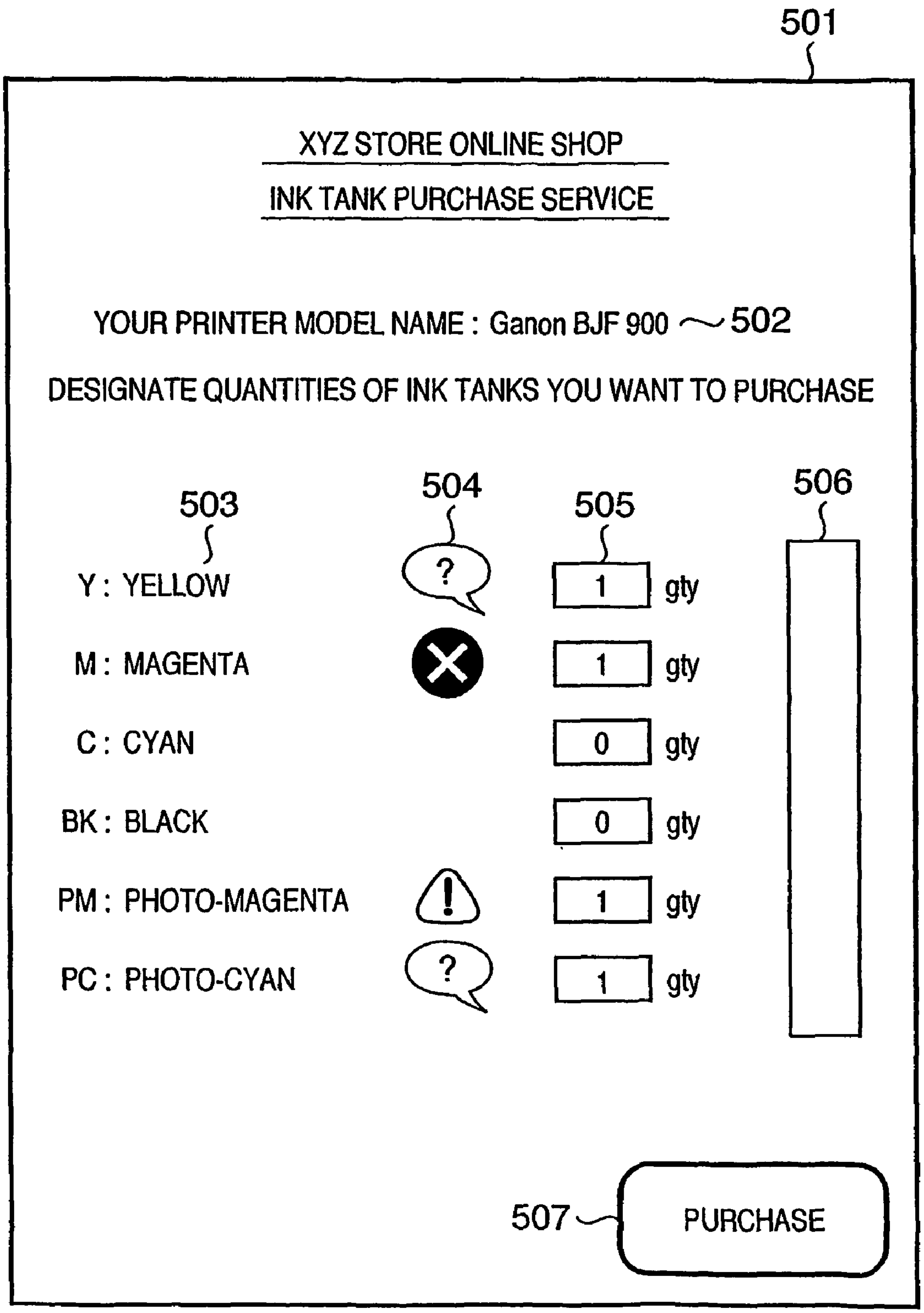
FIG. 5 shows an example of a support service page displayed by the WWW browser 112.

FIG. 5 shows an example of a support service page displayed by the WWW browser 112. Referring to FIG. 5, reference numeral 501 denotes a support service page displayed by the WWW browser 112. This support service page is displayed on the WWW browser 112 by the service providing server 121 in such a manner that the service determination unit 103 of the transfer server 101 executes a service determination process on the basis of the language of the client and printer retailer information 306 sent from the client the client terminal 111, acquires a URL or the like indicating an online service of a printer retailer as a result of that process, and transmits that URL to the WWW browser 112 to transfer it as the support service URL.

As shown in FIG. 5, the support service page will be described taking an online ink sales service page as an example. The support service page is displayed in a language designated as an argument of the support service URL. Also, a model designated as an argument is displayed, as indicated by 502. Reference numeral 506 denotes an ink tank purchase information field. Ink tank names 503, ink tank remaining amount icons 504, and ink tank purchase count input fields 505 are displayed in correspondence with the number of ink tanks of the corresponding printer model in accordance with ink tank remaining amount information designated by an argument of the support service URL. If the ink tank remaining amount is "half", "low", or "out", an ink tank remaining amount icon is displayed for each ink, and a default value "1" is input to the corresponding purchase count field of that ink.

Using this support service, the user can easily purchase required ink tanks without checking the printer in accordance with the remaining amounts of the individual ink tanks of his or her printer.

Also, the printer retailer can guide the user to continuously purchase printer expendables at the printer retailer.

The processes of the client terminal 111, transfer server 101, and service providing server 121 in the system that provides the aforementioned support service will be described below. Note that each of these processes is executed under the control of the operating system when the CPU 206 of each apparatus loads a program stored in the ROM 207 or HDD 209 onto the RAM 208.

Figure 6:
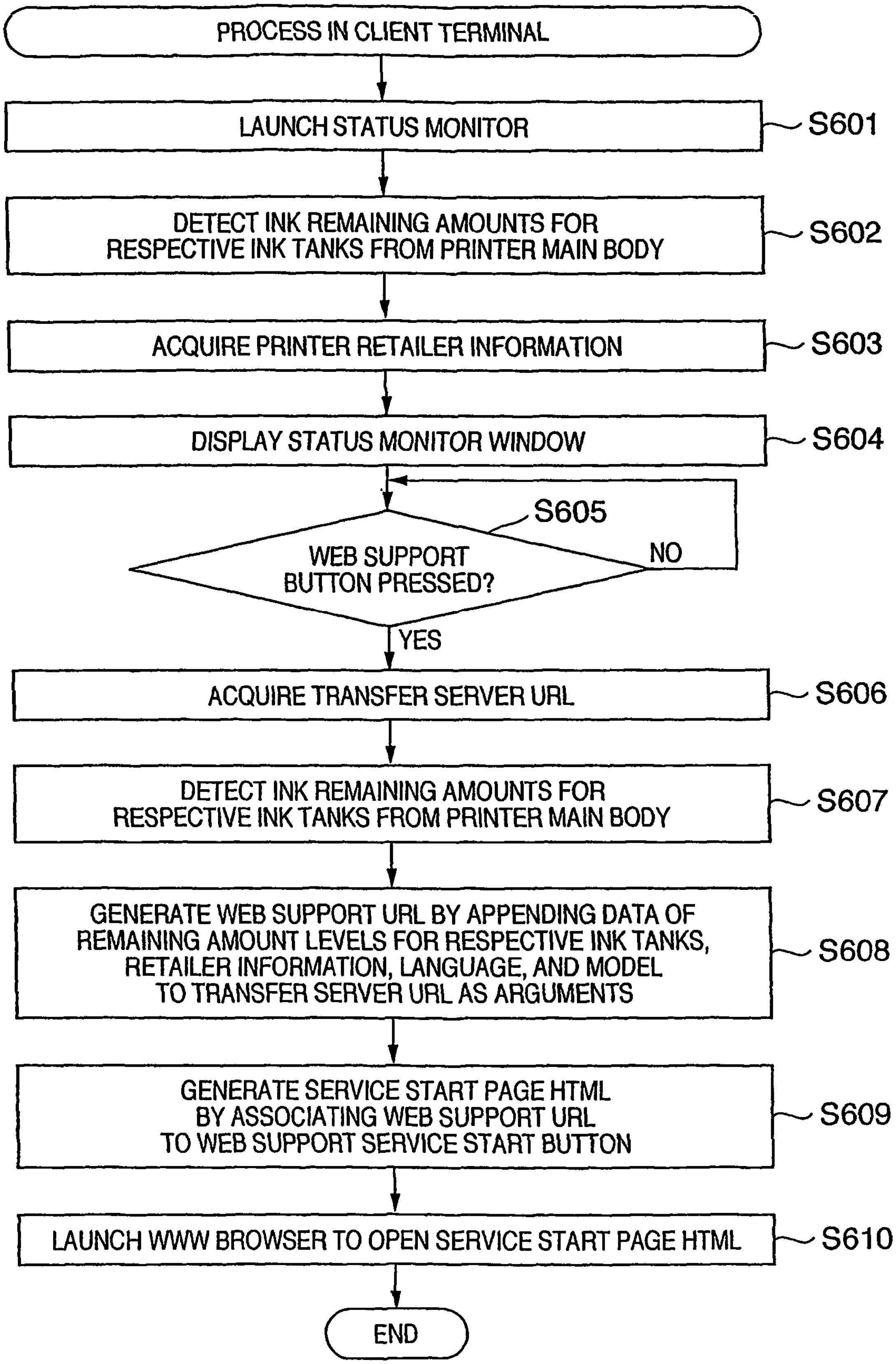
FIG. 6 is a flowchart showing the process of the client terminal 111 in the embodiment of the present invention.

FIG. 6 is a flowchart showing the process of the client terminal 111 in this embodiment. When the user purchased the printer 115, the printer retailer specifying data 117 is set in the client terminal 111. The setting method is not particularly specified in this embodiment. For example, printer retailer data may be set in the printer retailer specifying data 117 in the client terminal 111 using software delivered from a printer retailer. Alternatively, when the user purchased both the client terminal 111 and printer 115 from a retailer at the same time, retailer data may be set in the printer retailer specifying data 117 in the client terminal 111 before sales.

Figure 12:
FIG. 12 shows correspondence among the ink tank remaining amounts, remaining amount icons, and exchange recommendation levels.
Figure 12:
Figure 12:

In step S601, the status monitor 113 is automatically launched by the printer driver 114 when status to be presented to the user (e.g., a small ink remaining amount, paper jam, or the like) has occurred in the printer 115 white the user is executing a print process from arbitrary software, or simultaneously with the beginning of the print process. Also, the user can manually launch the status monitor 113. After the status monitor 113 is launched, the flow advances to step S602 to acquire the remaining amounts of individual ink tanks in correspondence with the number of ink tanks via a communication with the printer 115. The remaining amount of each ink tank is classified as one of some levels. In this case, the ink remaining amount is classified as one of four levels, as shown in FIG. 12. That is, the sufficient amount is classified as "full"; about the half amount, "half"; the small amount close to an exchange timing, "low"; and no amount, "out".

In step S603, the printer retailer specifying data 117 is acquired. If no printer retailer specifying data is set, "none" is set in the subsequent processes. In step S604, the status monitor window 301 is displayed on the display device 201. The ink tank information display area 303 displays the information of the ink tanks acquired in step S602. As shown in FIG. 12, the remaining amounts are indicated by icons according to the ink tank remaining amount levels (exchange recommendation levels) shown in FIG. 12. The printer retailer information acquired in step S603 is displayed on the printer retailer information display area 306.

In step S605, the control waits for user's operation. If the user has clicked (pressed) the WEB support button 305, the flow advances to step S606; otherwise, the control waits. In step S606, the URL of the transfer server 101, which is set in the system simultaneously when the status monitor (software) 113 is set in the client terminal 111, is acquired. In this embodiment, "http://www.websup.com/websup" will be exemplified as this URL.

In step S607, the remaining amounts of the individual ink tanks are acquired by the same process as in step S602 above, and the remaining amounts are classified for respective ink tanks. In step S608, data of the ink tank color names and remaining amount levels for respective ink tanks acquired in step S607, the printer retailer information acquired in step S603, the use language of the printer driver, and the printer model, with which the status monitor is currently communicating, are combined as arguments, and the combined data sequence is appended to the transfer server URL acquired in step S606, thus generating the WEB support URL 403.

In step S609, the WEB support URL 403 generated in step S608 is associated with the WEB support service start button 402 to generate the service start page HTML data 116. In step S610, the WWW browser 112 is launched as a process independent from the status monitor 113 to load and open the service start page HTML data 116 generated in step S609, thus displaying the service start page on the display device 201 of the client terminal 111.

With the above process, the user can observe the service start page on the client terminal 111. Since the WWW browser 112 is running as a process independent from the status monitor 113, the user can quit the status monitor 113.

The process in the client terminal 111 has been explained. The process executed in the transfer server 101 will be explained below.

Figure 7:
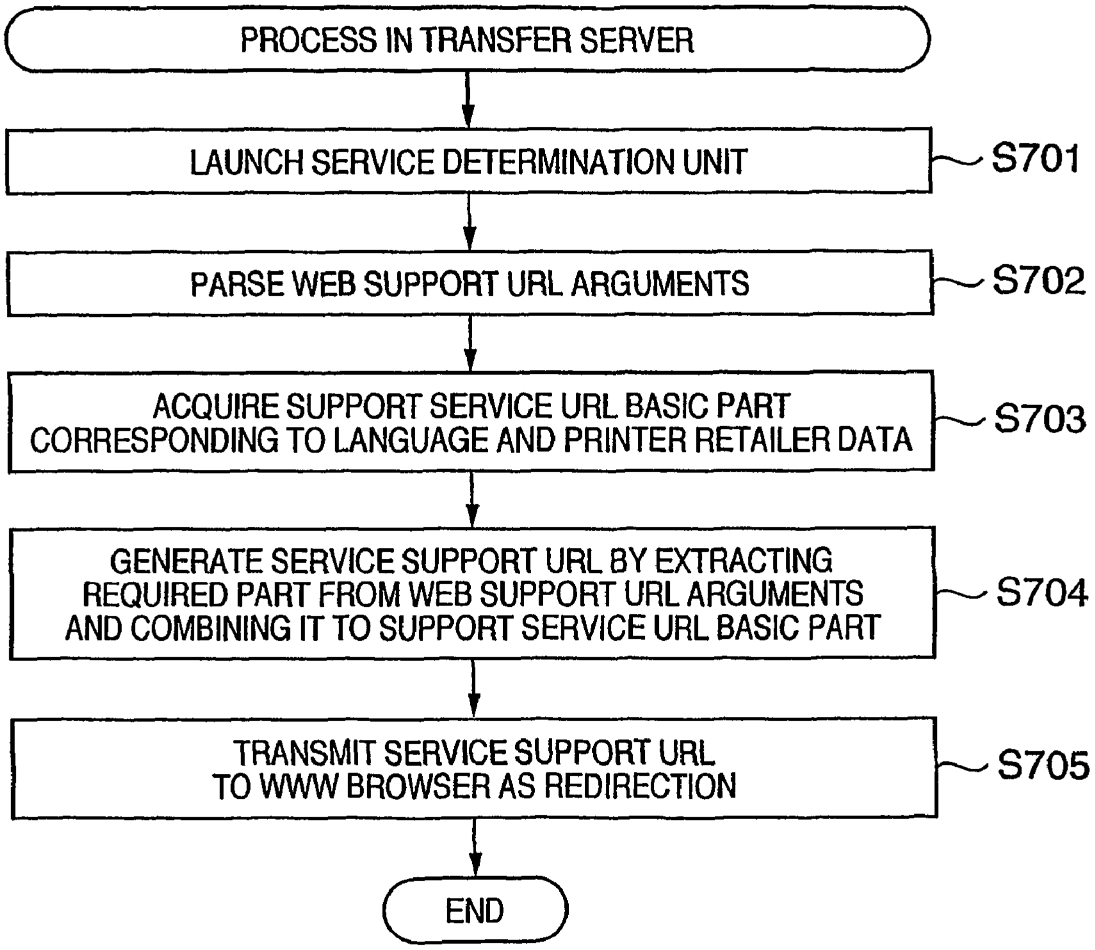
FIG. 7 is a flowchart showing the process of a transfer server 101 in the embodiment of the present invention.

FIG. 7 is a flowchart showing the process of the transfer server 101 in this embodiment. This process is a service transfer process executed by the service determination unit 103 of the transfer server 101 that has received the WEB support URL 403 transmitted from the WWW browser 112 when the user has clicked the WEB support service start button 402 on the client terminal 111.

In step S701, if the WWW server 102 of the transfer server 101 receives the aforementioned WEB support URL from the client terminal 111, the service determination unit 103 is launched. In step S702, the arguments of the WEB support URL 403 are parsed. In this embodiment, driver display language information ("lang=jp" in 403), printer model information ("model=F900" in 403), printer retailer information ("retailer=123" in 403), and ink tank remaining amount information ("Y=half&M=out&C=ik&BK=ok&PM=low&PC=half" in 403) are obtained as the parsing results of the arguments.

In step S703, a "support service URL basic part" is acquired with reference to the "support service transfer destination table" 105 shown in FIG. 9 on the basis of the language information and printer retailer information acquired in step S702. More specifically, in case of the WEB support URL 403 shown in FIG. 4, the support service transfer destination table 105 shown in FIG. 9 is searched using the language information "jp" and printer retailer information "123" as search keys to acquire "http://www.xyzeshop.co.jp/eStore" (902 in FIG. 9) as the support service URL basic part.

In step S704, the required part (e.g., all arguments "lang=jp&model=F900&Y=half&M=out&C=ik&BK=ok&PM=low&PC=half&retailer=123") of the WEB support URL arguments is appended to the support service URL basic part to generate a support service URL. For example, when all the arguments are appended, a URL shown in FIG. 10 is generated as the support service URL.

If no printer retailer information is notified, i.e., if no printer retailer specifying data 117 is set in the client terminal 111, an expendable sales service URL prepared by a printer vendor is acquired from the "support service transfer destination table" in FIG. 9 to generate the support service URL. For example, the support service URL is generated using a support service URL basic part (901 in FIG. 9) corresponding to data with a retailer field "—".

In step S705, the support service URL (FIG. 10) generated in step S704 is transmitted as redirection to the WWW browser 112 of the client terminal 111 via the WWW server 102.

When the WWW browser 112 of the client terminal 111 receives the support service URL, since it is redirection, information is transmitted to the server designated by that URL, i.e., to the service providing server 121.

The process in the transfer server 101 has been explained. The process to be executed in the service providing server 121 will be described below.

Figure 8:
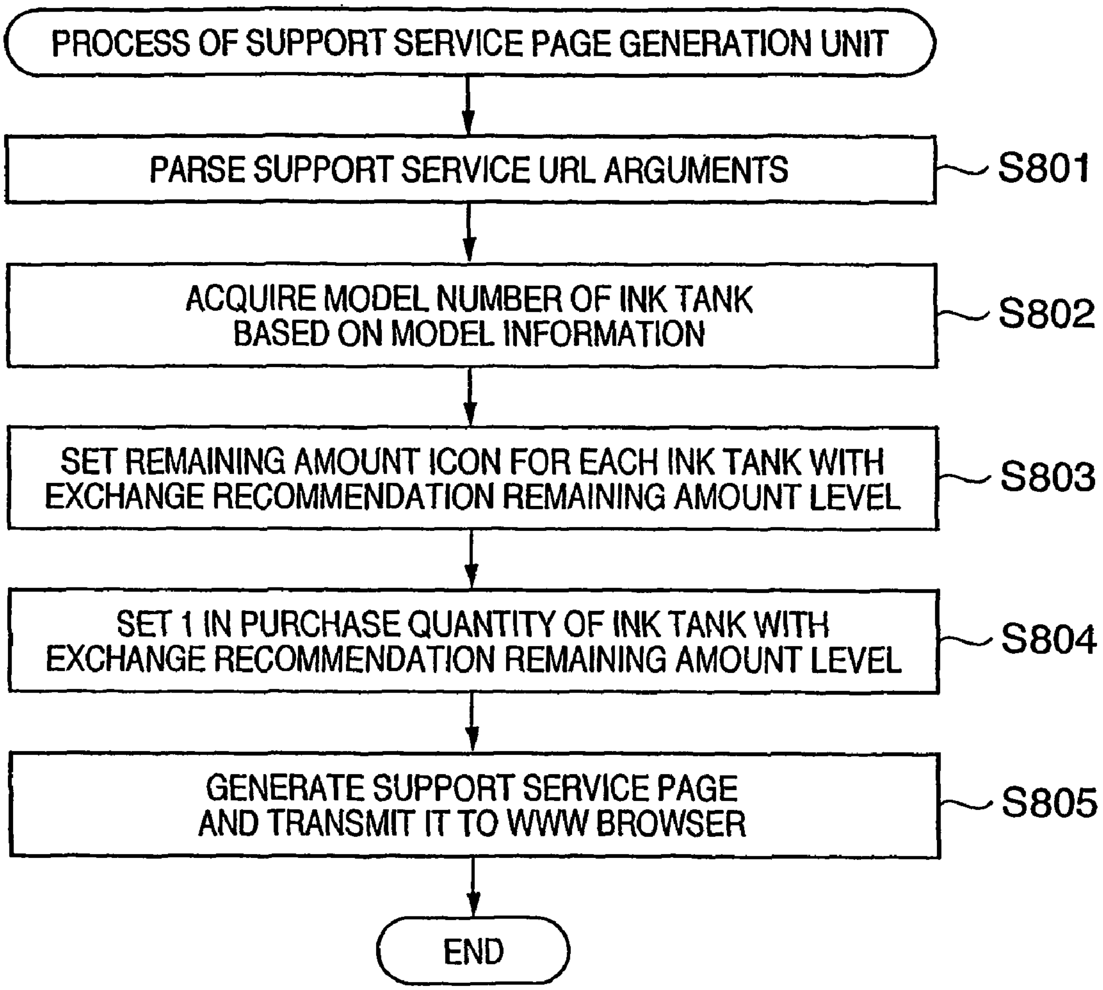
FIG. 8 is a flowchart showing the process of a service providing server 121 in the embodiment of the present invention.

FIG. 8 is a flowchart showing the process in the service providing server 121 in this embodiment. This process is executed by the support service page generation unit 122 of the service providing server 121.

As described above, the support service URL generated by the transfer server 101 reaches the WWW server 102 of the service providing server 121 via the WWW browser 112 of the client terminal 111 as redirection. The service providing server 121 launches the support service page generation unit 122 to provide a support service to the user.

In step S801, the arguments of the received support service URL are parsed. For example, when the WEB support URL shown in FIG. 10 is generated, driver display language information ("lang=jp" in FIG. 10), printer model information ("model=F900" in FIG. 10), printer retailer information ("retailer=123" in FIG. 10), and ink tank remaining amount information ("Y=half&M=out&C=ik&BK=ok&PM=low&PC=half" in FIG. 10) are obtained as the parsing results. The ink tank information is further parsed for respective ink tanks to obtain the remaining amount levels of respective ink tanks.

In step S802, the product model numbers of respective ink tanks are acquired based on the printer model information. More specifically, these model numbers are acquired from a "model—ink tank correspondence table" shown in FIG. 11. More specifically, in the example shown in FIG. 10, the model is "F900", and the ink tank model numbers corresponding to this model can be acquired. In step S803, ink tanks with the remaining amount levels at which exchange of the ink tanks is suggested are selected using an "ink tank remaining amount classification table". In this embodiment, the remaining amount level 1 or 2 is defined as an exchange recommendation level. In case of the ink tank remaining amount information shown in FIG. 10, yellow, magenta, photo-magenta, and photo-cyan are selected as ink tanks with the exchange recommendation levels. Then, remaining amount icons corresponding to their remaining amount levels are set.

In step S804, "1" is set in a purchase quantity of each ink tank selected as that with the exchange recommendation level in step S803. Also, "0": is set in a purchase quantity of each ink tank, which does not have the exchange recommendation level. In step S805, support service page HTML data is generated, and is transmitted to the WWW browser 112 of the client terminal 111, thus displaying the support service page 501 shown in FIG. 5 on the screen. The ink remaining amount icons set in step S803 are set, as indicated by the ink remaining amount icons 504 on the support service page 501 in this embodiment. In this way, the support service page generation process is done.

According to this embodiment, the client terminal 111 launches the status monitor 113 to generate a WEB support URL that indicates the printer status, printer retailer information, and especially, the remaining amounts for respective ink tanks, and to transmit the WEB support URL to the transfer server 101. The transfer server 101 looks up the support service transfer destination table on the basis of the received WEB support URL to generate a URL to the Service providing server 121, i.e., the support service URL, which is required to provide a support service corresponding to the printer retailer and ink tank states, and redirects it to the WWW browser 112 of the client terminal 111. The service providing server 121 receives the support service URL that includes printer information, and can provide a purchase page that presents ink tanks with the exchange recommendation levels in the user's printer by details to allow the user to easily buy them;

In this manner, the user can efficiently and easily purchase required ink tanks of the printer 115 connected to the client terminal 111 without making any memo of their remaining amounts. Also, since icons that suggest exchange are displayed for respective ink tanks, the user can be prevented from purchasing wrong inks.

For the printer retailer, the user who purchased the printer can continuously use that retailer since flexible services are continuously provided to that user.

As described above, according to the above embodiment, since the server is notified of the remaining amount information for respective ink tanks and printer retailer information of the printer connected to the client, a user's purchase operation of printer expendables can be facilitated.

The printer retailer that sold the printer can continuously sell its expendables.

Even when a given printer retailer disappears, the user can purchase ink tanks at an alternative shop site.

In this embodiment, the printer has been exemplified as a device, and the ink tanks have been exemplified as expendables of the device. However, the present invention is not limited to the printer, and can be applied to a device such as a digital camera and the like. Also, the present invention is not limited to the expendables, and can be applied to accessories of the device. For example, the present invention may be applied to a combination of a digital camera as a device, and a battery, recording medium, case, strap, and the like as expendables or accessories.

Another Embodiment

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a recording medium, which records a program code of a software program that can implement the functions of the above-mentioned embodiments to the system or apparatus, and reading out and executing the program code stored in the recording medium by a computer (or a CPU or MPU) of the system or apparatus.

In this case, the program code itself read out from the recording medium implements the functions of the above-mentioned embodiments, and the recording medium which stores the program code constitutes the present invention.

As the recording medium for supplying the program code, for example, a floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the recording medium is written in a memory of the extension board or unit.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2003-290590 filed on Aug. 8, 2003, which is hereby incorporated by reference herein.

The invention claimed is:

1. An online service system comprising:

a client terminal;

a transfer server; and a plurality of service providing apparatuses each capable of communicating via a network, wherein the client terminal is connected with a printer, and the client terminal comprises:

a display unit that automatically displays a status screen on a display when print processing is begun, the status screen including a support instruction unit;

a first acquisition unit that acquires information indicating a purchase place of the printer via a printer driver of the printer;

a second acquisition unit that acquires information indicating ink remaining amount of the printer when the support instruction unit is operated;

a first transmission unit that transmits additional information including the information indicating the ink remaining amount of the printer and the information indicating the purchase place of the printer to the transfer server by adding the additional information to a first address for accessing the transfer server;

a reception unit that receives, from the transfer server, a second address to which the information indicating at least the ink remaining amount of the printer of the additional information is added by the transfer server, the second address for accessing a service providing apparatus designated by the transfer server; and a second transmission unit that transmits the information added to the second address to the designated service providing apparatus by accessing the service providing apparatus using the second address to which the information indicating at least the ink remaining amount of the printer is added, wherein the transfer server comprises:

a designation unit that designates one of the plurality of service providing apparatuses based on the information indicating at least the purchase place of the printer of the additional information added to the first address;

an addition unit that adds the information indicating at least the ink remaining amount of the printer of the additional information to the second address for accessing the designated service providing apparatus; and a notification unit that notifies the client terminal of the second address to which the information indicating at least the ink remaining amount of the printer is added by the addition unit, and wherein the service providing apparatus comprises:

a screen information generation unit that generates screen information on the ink of the printer based on the information added to the second address by the addition unit, when the service providing apparatus is accessed using the second address to which the information indicating at least the ink remaining amount of the printer is added received from the client terminal; and a screen information transmission unit that transmits the generated screen information to the client terminal.

2. The system according to claim 1, wherein the screen information generation unit generates the screen information for displaying icons corresponding to the ink remaining amount.

3. A client terminal connected with a printer and being capable of communicating with a transfer server and a service providing apparatus, the client terminal comprising:

a first acquisition unit that acquires information indicating a purchase place of the printer via a printer driver of the printer;

a display unit that automatically displays a status screen on a display when print processing is begun, the status screen including a support instruction unit;

a second acquisition unit that acquires information indicating ink remaining amount of the printer when the support instruction unit is operated;

a first transmission unit that transmits additional information including the information indicating the ink remaining amount of the printer and the information indicating the purchase place of the printer to the transfer server by adding the additional information to a first address for accessing the transfer server;

a first reception unit that receives, from the transfer server, a second address to which the information indicating at least the ink remaining amount of the printer of the additional information is added to the second address by the transfer server, the second address for accessing a service providing apparatus designated by the transfer server based on the information indicating at least the purchase place of the printer of the additional information added to the first address;

a second transmission unit that transmits the information added to the second address to the designated service providing apparatus by accessing the service providing apparatus using the second address to which the information indicating at least the ink remaining amount of the printer is added;

a second reception unit that receives screen information on the ink of the printer from the service providing apparatus, the screen information being generated by the service providing apparatus based on the information indicating at least the ink remaining amount of the printer added to the second address transmitted by the second transmission unit; and a display unit which displays the screen information on the ink of the printer received by the second reception unit on the display.

4. The client terminal according to claim 3, wherein the additional information further includes model information of the printer, and the screen information is generated by the service providing apparatus according to the information indicating the ink remaining amount and the model information of the additional information.

5. A method for a client terminal connected with a printer and being capable of communicating with a transfer server and a service providing apparatus, the method comprising:

a first acquisition step of acquiring information indicating a purchase place of the printer via a printer driver of the printer;

a first display step of automatically displaying a status screen on a display when print processing is begun, the status screen including a support instruction unit;

a second acquisition step of acquiring information indicating ink remaining amount of the printer when the support instruction unit is operated;

a first transmission step of transmitting additional information including the information indicating the ink remaining amount of the printer and the information indicating the purchase place of the printer to the transfer server by adding the additional information to a first address for accessing the transfer server;

a first reception step of receiving, from the transfer server, a second address to which the information indicating at least the ink remaining amount of the printer of the additional information is added to the second address by the transfer server, the second address for accessing a service providing apparatus designated by the transfer server based on the information indicating at least the purchase place of the printer of the additional information added to the first address;

a second transmission step of transmitting the information added to the second address to the designated service providing apparatus by accessing the service providing apparatus using the second address to which the information indicating at least the ink remaining amount of the printer is added;

a second reception step of receiving screen information on the ink of the printer from the service providing apparatus, the screen information being generated by the service providing apparatus based on the information indicating at least the ink remaining amout of the printer added to the second address transmitted by the second transmission step; and a second display step of displaying the screen information on the ink of the printer received by the second reception step on the display.

6. A non-transitory computer-readable storage medium on which is stored a program for causing a computer to execute a method for a client terminal connected with a printer and being capable of communicating with a transfer server and a service providing apparatus, the method comprising:

a first acquisition step of acquiring information indicating a purchase place of the printer via a printer driver of the printer;

a first display step of automatically displaying a status screen on a display when print processing is begun, the status screen including a support instruction unit;

a second acquisition step of acquiring information indicating ink remaining amount of the printer when the support instruction unit is operated;

a first transmission step of transmitting additional information including the information indicating the ink remaining amount of the printer and the information indicating the purchase place of the printer to the transfer server by adding the additional information to a first address for accessing the transfer server;

a first reception step of receiving, from the transfer server, a second address to which the information indicating at least the ink remaining amount of the printer of the additional information is added to the second address by the transfer server, the second address for accessing a service providing apparatus designated by the transfer server based on the information indicating at least the purchase place of the printer of additional information added to the first address;

a second transmission step of transmitting the information added to the second address to the designated service providing apparatus by accessing the service providing apparatus using the second address to which the information indicating at least the ink remaining amount of the printer is added;

a second reception step of receiving screen information on the ink of the printer from the service providing apparatus, the screen information being generated by the service providing apparatus based on the information indicating at least the ink remaining amount of the printer added to the second address transmitted by the second transmission step; and a second display step of displaying the screen information on the ink of the printer received by the second reception step on the display.

* * * * *